United States Patent
Castillo-Effen et al.

(10) Patent No.: US 10,633,093 B2
(45) Date of Patent: Apr. 28, 2020

(54) THREE-DIMENSIONAL ROBOTIC INSPECTION SYSTEM

(71) Applicant: General Electric Company, Schenectady, NY (US)

(72) Inventors: Mauricio Castillo-Effen, Niskayuna, NY (US); Ching-Ling Huang, San Ramon, CA (US); Raju Venkataramana, San Ramon, CA (US); Roberto Silva Filho, San Ramon, CA (US); Alex Tepper, Norwalk, CT (US); Steven Gray, Niskayuna, NY (US); Yakov Polishchuk, Niskayuna, NY (US); Viktor Holovashchenko, Niskayuna, NY (US); Charles Theurer, Alplaus, NY (US); Yang Zhao, Niskayuna, NY (US); Ghulam Ali Baloch, Niskayuna, NY (US); Douglas Forman, Schenectady, NY (US); Shiraj Sen, Niskayuna, NY (US); Huan Tan, Niskayuna, NY (US); Arpit Jain, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/587,950

(22) Filed: May 5, 2017

(65) Prior Publication Data
US 2018/0321692 A1    Nov. 8, 2018

(51) Int. Cl.
*G06T 15/00* (2011.01)
*B64C 39/02* (2006.01)
(Continued)

(52) U.S. Cl.
CPC ......... *B64C 39/024* (2013.01); *G05D 1/0094* (2013.01); *G05D 1/101* (2013.01);
(Continued)

(58) Field of Classification Search
CPC .... G05D 1/0044; G06T 19/003; G06T 19/006
See application file for complete search history.

(56) References Cited

U.S. PATENT DOCUMENTS

| | | | |
|---|---|---|---|
| 8,543,265 | B2 | 9/2013 | Ekhaguere et al. |
| 9,075,415 | B2 | 7/2015 | Kugelmass |

(Continued)

FOREIGN PATENT DOCUMENTS

| | | |
|---|---|---|
| KR | 102017 000 2191 A | 1/2017 |
| WO | 2016140985 A1 | 9/2016 |

OTHER PUBLICATIONS

Zarea, et al., "First Steps in Developing an Automated Aerial Surveillance", Journal of Risk Rewards, vol. 16, Nos. 3-4, 2013, 14 pp.

(Continued)

*Primary Examiner* — Charles Tseng
(74) *Attorney, Agent, or Firm* — Fletcher Yoder, P.C.

(57) ABSTRACT

Provided are systems and methods for monitoring an asset via an autonomous model-driven inspection. In an example, the method may include storing an inspection plan including a virtually created three-dimensional (3D) model of a travel path with respect to a virtual asset that is created in virtual space, converting the virtually created 3D model of the travel path about the virtual asset into a physical travel path about a physical asset corresponding to the virtual asset, autonomously controlling vertical and lateral movement of the unmanned robot in three dimensions with respect to the physical asset based on the physical travel path and capturing data at one or more regions of interest, and capturing (Continued)

data at one or more regions of interest, and storing information concerning the captured data about the asset.

20 Claims, 6 Drawing Sheets

(51) Int. Cl.
    *G05D 1/00*     (2006.01)
    *G06T 19/00*     (2011.01)
    *G05D 1/10*     (2006.01)

(52) U.S. Cl.
    CPC .......... *G06T 19/003* (2013.01); *G06T 19/006* (2013.01); *B64C 2201/123* (2013.01); *Y10S 901/44* (2013.01)

(56) References Cited

U.S. PATENT DOCUMENTS

| | | | |
|---|---|---|---|
| 9,104,202 B2 * | 8/2015 | Pack | G05D 1/0038 |
| 9,162,753 B1 | 10/2015 | Panto et al. | |
| 9,412,278 B1 | 8/2016 | Gong et al. | |
| 9,463,574 B2 * | 10/2016 | Purkayastha | B25J 9/1697 |
| 9,513,635 B1 | 12/2016 | Bethke et al. | |
| 9,613,538 B1 * | 4/2017 | Poole | H04N 7/183 |
| 2010/0077311 A1 * | 3/2010 | Santoro | G06T 15/04 |
| | | | 715/738 |
| 2010/0286859 A1 * | 11/2010 | Feigh | G05D 1/0044 |
| | | | 701/25 |
| 2011/0144828 A1 | 6/2011 | Chengalva | |
| 2012/0072052 A1 * | 3/2012 | Powers | G05D 1/0044 |
| | | | 701/2 |
| 2014/0018979 A1 * | 1/2014 | Goossen | G08G 5/0034 |
| | | | 701/3 |
| 2014/0316636 A1 * | 10/2014 | Hong | G05D 1/0016 |
| | | | 701/27 |
| 2015/0009331 A1 | 1/2015 | Venkatraman | |
| 2016/0017866 A1 | 1/2016 | Craft et al. | |
| 2016/0266579 A1 | 9/2016 | Chen et al. | |
| 2017/0039764 A1 * | 2/2017 | Hu | G08G 5/0013 |
| 2017/0039859 A1 | 2/2017 | Hu et al. | |
| 2017/0046873 A1 | 2/2017 | Terry et al. | |

OTHER PUBLICATIONS

Purohit, et al. "SugarMap: Location-less Coverage for Micro-Aerial Sensing Swarms", Information Processing in Sensor Networks, Apr. 8-11, 2013, Philadelphia, PA, 10 pp.

Bircher, et al. "Structural Inspection Planning via Iterative Viewpoint Resampling with Application to Aerial Robotics", International Conference on Robotics and Automation, 2015, 8 pp.

International Search Report and Written Opinion issued in connection with corresponding PCT Application No. PCT/US18/30368 dated Aug. 30, 2018.

* cited by examiner

THREE-DIMENSIONAL ROBOTIC INSPECTION SYSTEM

BACKGROUND

Machine and equipment assets, generally, are engineered to perform particular tasks as part of a business process. Assets are used and maintained for a variety of purposes including energy, transportation, healthcare, manufacturing, and the like. For example, assets may include distributed assets, such as a pipeline, a bridge, an electrical grid, or the like, as well as individual or discrete assets, such as a tower, a locomotive, a wind turbine, a gas flare, drilling/mining equipment, and the like. The design and implementation of these assets often takes into account both the physics of the task at hand, as well as the environment in which such assets are configured to operate.

Despite being well constructed of such materials as steel, concrete, brick, and the like, assets often deteriorate over time due to exposure to environmental conditions and other factors. Assets may experience various types of defects including spontaneous mechanical defects, electrical defects, as well as routine wear-and-tear. These defects can severely impact the operation and performance of the asset. For example, an asset may undergo corrosion or experience cracking due to weather and temperature or the asset may exhibit deteriorating performance or efficiency due to the wear or failure of certain component parts. If the damage to the asset is not repaired in a timely manner, it can lead to more serious problems and even cause the asset to break down completely.

Typically, a human inspector such as an expert or a technician of a particular type of asset may inspect, maintain, repair, and request repairs to an asset. For example, the inspector may locate corrosion on the asset and clean the corrosion therefrom, identify a part of the asset that needs replacement and order and install the replacement part, and the like. However, depending on a location of the asset, a size of the asset, and/or a complexity of the asset, human inspection of the asset can be difficult and dangerous. For example, it is difficult for a person to inspect the blades of an operating wind turbine, the tower of a gas flare, or the like, without risking potential injury. In addition, assets can be located in harsh environments such as at sea, in deserted areas, near high temperature systems (e.g., oil and gas), inside mines or tanks, and the like. Therefore, improved systems and techniques for monitoring the health of assets are needed.

SUMMARY

Embodiments described herein improve upon the prior art by providing systems and methods for performing robotic inspection system of an asset via an unmanned robot such as a drone. The unmanned robot can travel to the asset and monitor and analyze the health of the asset by capturing image data, and the like. In various embodiments, the unmanned robot can move autonomously (i.e., without user control) in both lateral and vertical directions with respect to the asset based on a three-dimensional (3D) model of a travel path that is generated virtually based on a virtual asset that corresponds to the physical or real asset. The 3D model generated in virtual space may be aligned with the real world (i.e., geo-spatially) to generate a real travel path based on the 3D model of the travel path. That is, rather than rely on GPS latitude and longitude components, or require initial surveillance of an asset, the unmanned robot can be controlled to move both vertically and laterally at the same time in real space based on a 3D model created in virtual space. Such embodiments provide an improved ability to inspect an asset by using 3D models to control 3D movement of the unmanned robot about the asset.

In an aspect of an example embodiment, provided is a method of an unmanned robot for monitoring an asset via an autonomous model-driven inspection, the method including storing an inspection plan of an asset to be performed by the unmanned robot, the inspection plan comprising a three-dimensional (3D) model of a travel path about the asset including regions of interest (ROIs) of the asset, executing the inspection plan, the executing comprising autonomously controlling vertical movement and lateral movement of the unmanned robot along the travel path about the asset based on the 3D model of the travel path, and controlling one or more sensors of the unmanned robot to capture data of the asset at the ROIs, and storing information concerning the data of the asset captured by the one or more sensors.

In an aspect of another example embodiment, provided is a robotic inspection system, including a storage configured to store an inspection plan of an asset to be performed by the unmanned robot, the inspection plan comprising a three-dimensional (3D) model of a travel path about the asset including regions of interest (ROIs) of the asset, a processor configured to autonomously control vertical movement and lateral movement of the unmanned robot along the travel path about the asset based on the 3D model of the travel path, and control one or more sensors of the unmanned robot to capture data of the asset at the ROIs, and the storage is further configured to store information concerning the data of the asset captured by the one or more sensors.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings which are briefly described as follows.

Figure 1:
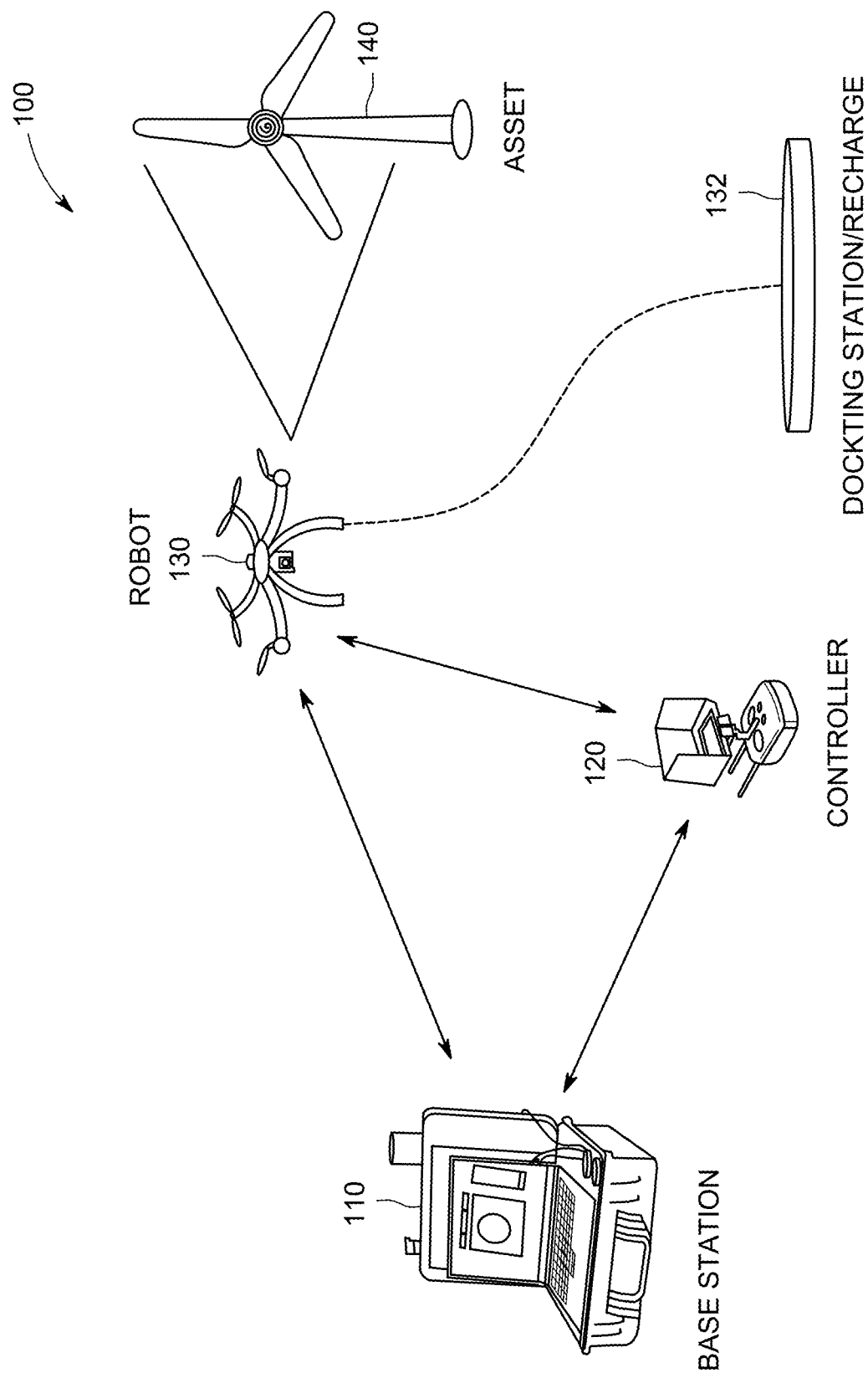
FIG. 1 is a diagram illustrating a robotic inspection system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Drones and other unmanned robots have been increasingly used for different industrial tasks. One such task is the inspection of industrial assets, and in particular, inspection of assets that pose some kind of safety hazards for maintenance crew. Robots can reach difficult-to-access locations on or about an asset, including regions on a flare stack, a wind turbine, power lines, a power tower, within tanks, on platforms at sea, and the like. An inspection is typically performed by taking close-up pictures and videos of areas of the asset, and by collecting environmental data that can be used to detect symptoms, diagnose problems, and plan corrective maintenance procedures.

Related inspection methods with robots such as drones requires at least two people, a pilot and an inspector. The pilot operates the drone while it is near the asset and stops at certain points of interest. The inspector remotely controls the drone camera gimbal, shutter and other sensors, collecting data and taking high-resolution photos and measurements of these points of interest. The inspector also monitors a live camera view to ensure that the camera gimbal is properly aimed, pictures are correctly taken and exposed, and the sensor data is within acceptable ranges. This is important to assure the quality of data collected and, as a consequence, the overall quality of the inspection. However, due to communication bandwidth and on-board drone hardware limitations, the quality of the data can only be fully assessed after the drone lands.

Typically, when the drone is docked, the inspector downloads the photos from the drone (usually via SD card or cable) and goes over the photos in a manual process. If important shots are unclear, improperly centered, or even missing, the measurements have to be re-taken, requiring the drone to be flown again to cover a subset of the points of interests. At the end of the inspection, all photos and sensor data are saved in a computer and brought back to an inspection station where a final inspection report is produced, with the detected problems described and with the picture evidence. This report may also be saved as a maintenance record and a future reference of asset condition.

These related inspection processes are often ad-hoc, with limited planning before visiting a site and flying the drone. Inspectors use their judgment and experience to guide the pilot through different points of interest on or around the asset based on current conditions. In some cases, the drone may even take one or two preliminary flights to determine a location of the asset and its parts. It might take several iterations of drone flights and photos to be taken until the photos are deemed satisfactory (i.e., clearly show the points of interests and are correctly exposed) and the location of the asset is fully understood. This is a time-consuming process, depending on the number of points of interests, weather condition and the manual skills of both pilot and inspector. This inefficiency also incurs more cost in terms of labor and resources.

According to various embodiments, provided is a robotic system for monitoring a health of an asset. The system includes at least one autonomous robot (e.g., an aircraft, a crawling robot, a walking robot, a submersible, etc.) that has imaging and/or sensing capabilities and is capable of autonomous or semi-autonomous movement. For example, the robot may be an unmanned aircraft vehicle (UAV) such as a drone, or other type of robot (e.g., crawler, roller, walker, autonomous underwater vehicle (AUV), etc.) The operation of the robot may have varying degrees of autonomy, between semi-autonomous and fully autonomous based on onboard computers and software. In order to adequately monitor the asset, the robot described herein is configured to move autonomously and without user control in lateral, longitudinal, and vertical directions based on a virtually created three-dimensional (3D) travel path. In addition, the robot may simultaneously change both lateral and vertical movements enabling automatic and highly accurate 3D movement (e.g., within centimeters) about the asset without user control. The virtually created 3D travel path and robot orientation may be virtually modeled by a user or system via a user interface and transmitted or otherwise provided to the robot. Based on the virtual 3D travel path, a processor of the robot may align the virtual 3D travel path with the real world and control movement of the robot three-dimensionally.

As mentioned, the autonomous movement may be completely autonomous or semi-autonomous. For example, in a semi-autonomous situation, a user may control the flight or movement of the robot while the robot autonomously controls a sensor attached to the robot to change orientation and field of view while capturing data/images based on the flight inspection plan that includes the 3D travel path. In another example, the movement of the robot may be completely autonomous. In this situation, no human interaction is necessary and the unmanned vehicle can take off from its base, fly, walk, roll, or swim, on its planned path, and return safely back to base on a predetermined schedule.

An inspection plan (e.g., flight inspection plan) including the virtual 3D travel path of and/or about an asset may be provided to the robot (or a computer system thereof) via a data link. The robot may travel to a location of the asset in the real world and align the virtually created 3D model of the travel path with a real travel path based on global positioning system (GPS) coordinates of the asset in comparison to GPS coordinates of the robot. Although, it should be appreciated that GPS is not required. For example, the 3D travel path may be defined with respect to the asset to be inspected, and other means of localization besides GPS may be used such as self-localization techniques based on the 3D travel path. Once the robot has arrived at a desired start location, the robot may move along the real travel path from the start location to an end location in an autonomous or semi-autonomous fashion based on the virtual 3D travel path included in the inspection plan. The start and stop locations of the travel path may be dynamically selected by a user when generating the virtual 3D travel path. Accordingly, only specific areas of interest about the asset can be monitored and evaluated dynamically instead of requiring a drone or other robot to monitor the asset from top to bottom.

While executing the travel path, the robot may stop, pause, slow down, speed-up, maintain speed, etc., and capture images as well as sense for other data (e.g., temperature, humidity, pressure, etc.) at various regions of interest (ROI) designated by the inspection plan. For each ROI, the virtual 3D model of the travel path may also include three-dimensional coordinates (e.g., X, Y, and Z axis coordinates) at which the robot is to be located for performing inspection. In addition to a location in three dimensional space, each ROI may include a perspective with respect to a surface of the asset at which the robot should capture data images, field of view of a camera, orientation, and the like. To execute tasks such as the travel path, the robot may use two models including a model of the world for safe autonomous navigation, and a model of the asset which contains the location of regions of interest. Based on the model of the world the robot is capable of determining where things are such as the asset as well as surrounding environment. Based on the model of the asset, the robot knows where to execute tasks at regions of interest.

The robotic system may be used to monitor, repair and maintain an asset. As discussed herein, assets may be generally discrete or limited in their extent (e.g., a transportation vehicle such as an aircraft, locomotive, subway, helicopter, ship, submersible, space launch vehicle, satellite, and so forth) or may be geographically distributed (e.g., a road or rail track, a port or airport, a pipeline, electrical infrastructure, a power generation facility, manufacturing plant, wind farm, bridge, platform, and so forth). The present approach as described herein may be used to monitor (e.g., visually inspect) and maintain assets in an autonomous or semi-autonomous manner using robotic intermediaries such as unmanned drones or other robots. As discussed herein, the robotic intermediaries may be used to facilitate one or both of health monitoring of the asset and repair, remediation, or improvement of the asset with limited or no human support.

Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, the health of the asset depends on identifying and addressing such defects in a timely and effective manner. In some embodiments, an asset model stored by the robot may capture the historical development of deterioration of the asset as well as changes in the surrounding environment, for example. During travel path generation, an inspector may be interested in comparing pictures of a specific ROI at different times. Those comparisons may be computer-aided, for example to measure growth of corrosion.

The example embodiments provide a robot system that may be used to monitor and manage the health of an asset that reduces or eliminates human intervention. A robot may be a machine (e.g., electro-mechanical) capable of carrying out a set of tasks (e.g., movement of all or part of the robot, operation of one or more type of sensors to acquire sensed data or measurements, and so forth) automatically (e.g., at least partially without input, oversight, or control by a user), such as a set of tasks programmed by a computer. For example, the robot may include one or more sensors to detect one or more characteristics of an asset and one or more effectors to perform an operation based on a 3D virtual inspection plan to assess, repair, and/or service the asset. The robot may include a processing system that includes one or more processors operatively coupled to memory and storage components. The robot may also include effectors capable of performing monitoring and maintenance of an asset under the control the processing system.

FIG. 1 illustrates a robotic inspection system 100 in accordance with an example embodiment. Referring to FIG. 1, the robotic inspection system 100 includes an unmanned robot 130 that inspects an asset 140. For example, the unmanned robot 130 may include an unmanned aerial vehicle (UAV) such as a drone, a crawling robot, a rolling robot, a walking robot, and/or the like. In the example of FIG. 1, the unmanned robot 130 includes a docking station 132 for recharging and storage. Also, the unmanned robot 130 may communicate with a controller 120 and/or a base station 110. For example, the controller 120 and the base station 110 may receive data from and transmit data to the unmanned robot 130 via a data communication channel. Also, in some examples the base station 110 may receive input from a user (e.g., an engineer) sending commands to the unmanned robot 110 via the data communication channel. The communication channel may be wireless, for example, satellite, cellular, local, and/or the like, and/or it may be wired in some instances.

The asset 140 may be a structure that is disposed at a geographical location accessible by the unmanned robot 130. For example, the asset 140 may be an oil platform disposed at sea, a tank or well that is disposed under the earth's surface, a pipeline disposed along the earth's surface, a bridge, a gas flare, a turbine, and/or the like. Based on an inspection plan, the unmanned robot 130 may autonomously move about and around the asset 140 while inspecting (e.g., collecting data) from the asset 140. In the example of FIG. 1, the unmanned robot 130 is a drone that can fly about the asset 140. The drone can land on locations on a surface of the asset 140, pause in mid-air, and the like. As described herein, the drone 130 may fly about a travel path around the asset 140 based on a 3D model of a virtual travel path included in a flight inspection plan. In some cases, the drone 130 may also receive instructions providing a travel path from the docking station 132 to a starting point of the flight inspection plan.

According to various embodiments, the unmanned robot 130 may perform an inspection of a plurality of regions of interest of the asset 140 based on a 3D virtual inspection plan that is received from the base station 110, the controller 120, or input locally through the unmanned robot 130. The regions of interest may be positioned at various distributed locations throughout the asset 140, clustered within a predefined area of the asset 140, and/or the like. Each region of interest may include a position to be inspected on the asset, an orientation at which the camera (or other sensor) should be positioned with respect to a surface of the asset at the region of interest, a rotation about the asset that the drone should travel while capturing sensor data, a field of view, and the like.

Figure 2:
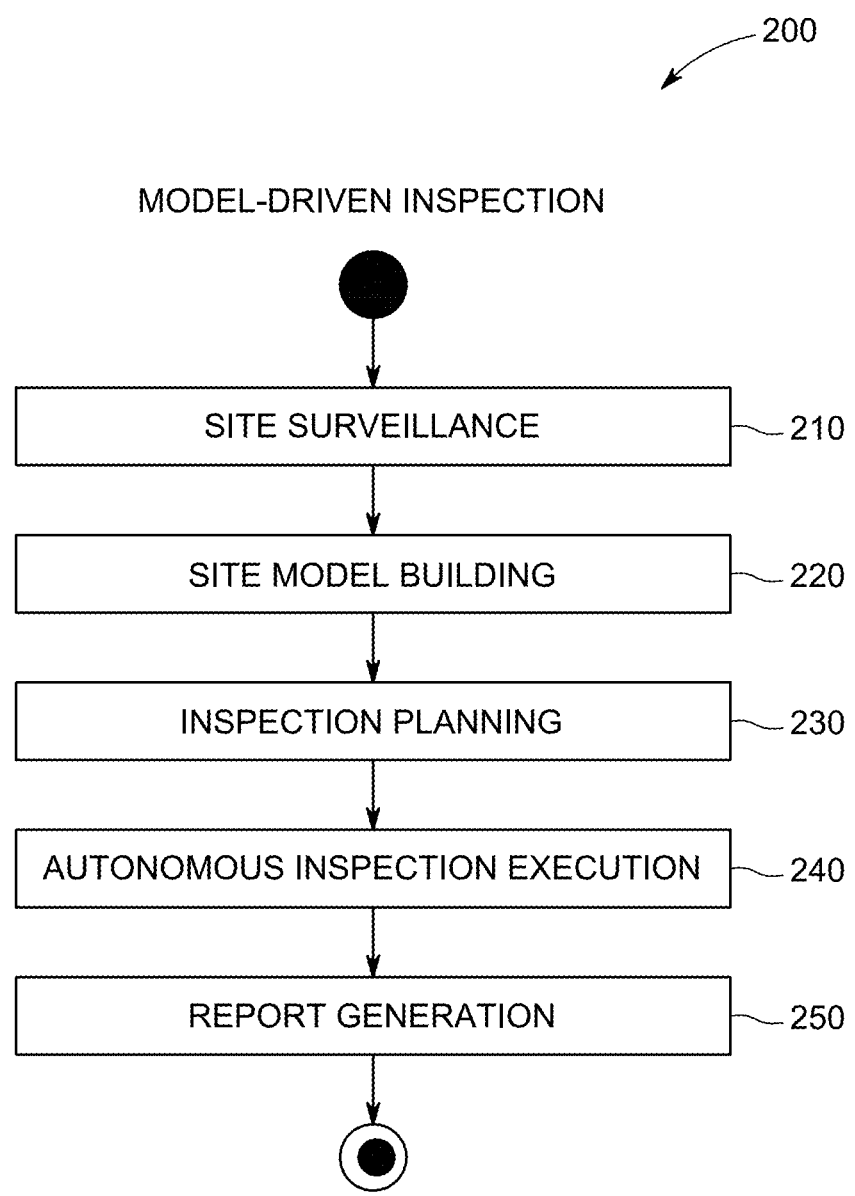
FIG. 2 is a diagram illustrating a model-driven asset inspection process in accordance with an example embodiment.

FIG. 2 illustrates an end-to-end robotic inspection process 200 that may be performed for monitoring the health of an asset in accordance with an example embodiment. The process 200 may be performed by the system shown in FIG. 1, or another device or plurality of devices. Referring to FIG. 2, in 210, site information and/or detailed asset 3D models may be collected from a site through a surveillance and planning stage. For example, the site information may be obtained by a robot that includes a depth sensor and cameras (e.g., RGB, infrared, etc.) mounted thereon (e.g., a UAV, drone, etc.) which can be a different robot than the inspection robot performing the inspection process or it may be the same robot. As another example, the site information may be gather from historic data and/or models in virtual space.

In 220, an asset model is designed, for example, based on the surveilled information and/or historical information of the asset and its parts. The asset model may include a 3D virtual model that is a digital replica (i.e., digital twin) of a corresponding real (i.e., physical) asset. In some examples, the asset model may contain additional semantic information (also referred to as labels) identifying specific assembly components within the asset, history of maintenance and repair actions of each component, and other information that may be used to update, maintain, or generate new inspection plans for the asset or similar types of assets. Aside from component labels, semantic information may also include features and characteristics such as anomalies (e.g., cracks, corrosion, etc.) that may have been identified during the initial process of building the 3D model or afterwards. Semantic information may be generated manually, but also via automated techniques such as software leveraging computer vision and machine learning techniques.

In order to generate the inspection plan, a user interface may be provided and may be interacted with via a user device such as the base station, a tablet, or other computer, allowing a user such as an inspector to identify regions of interest with respect to the virtual asset. For example, the user may specify one or more regions of interest on a virtual asset's 3D model, indicating features such as each point's location, field of view, how many shots and sensor measurements should be taken, orientation, and the like. According to various embodiments, the user annotated model of the virtual asset may be used to auto-generate a highly accurate virtual 3D robot travel path (e.g., drone flight inspection plan) in 230. For example, the application described herein may generate a virtual 3D travel path about the asset in virtual space to be used by the robot during the inspection process.

Figure 4:
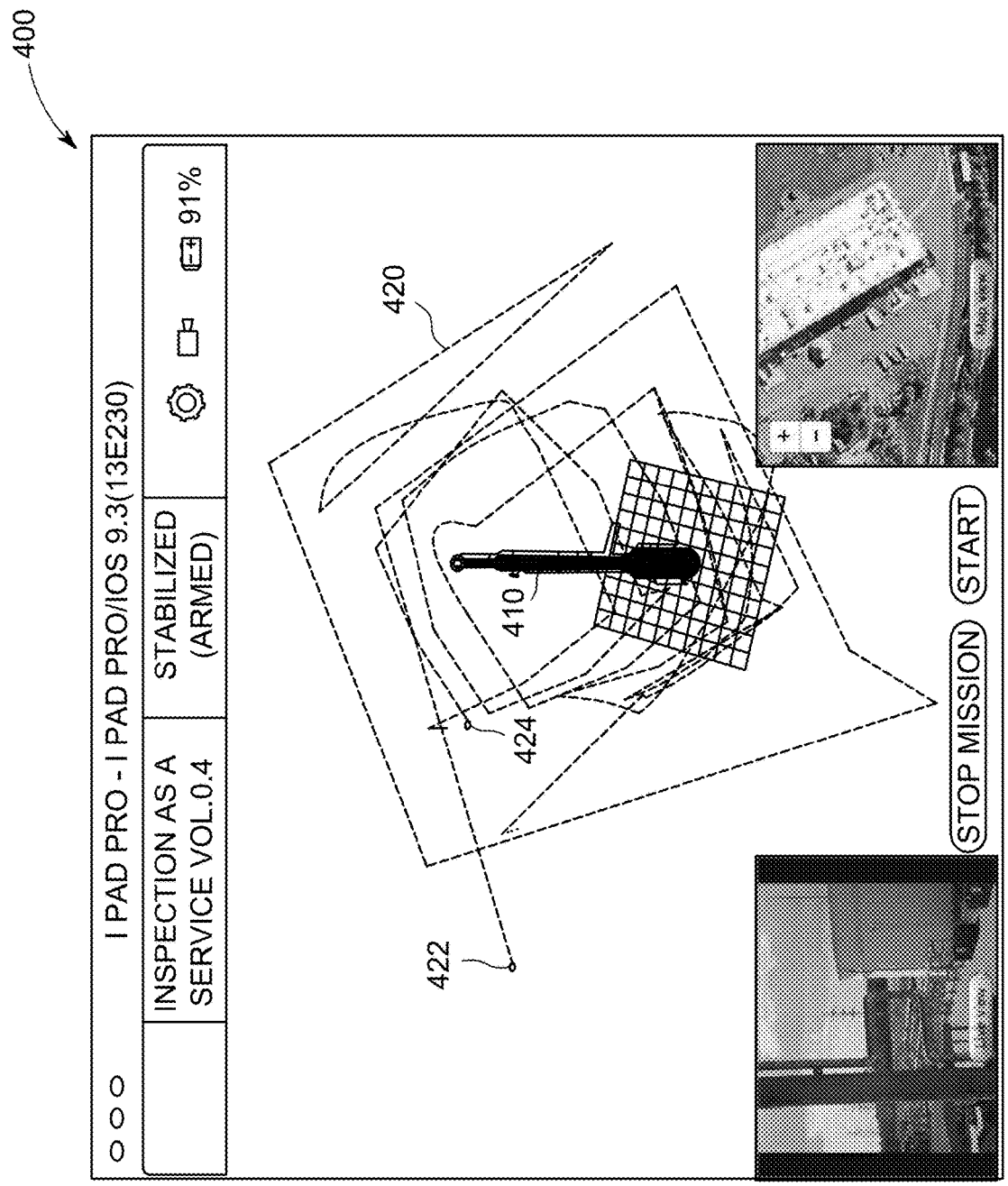
FIG. 4 is a diagram illustrating a virtual 3D model of a travel path with respect to an asset in accordance with an example embodiment.

A non-limiting example of a virtual 3D travel path is shown in FIG. 4 via a screen shot of a user interface 400. In this example, virtually created 3D travel path 420 is positioned about an asset 410 and includes a plurality of regions of interest. When generated, the travel path 420 may include an order in which the ROIs are to be inspected by the robot. Each virtual 3D travel path (e.g., flight route) may correspond to a sequence of travel paths and way points in real space. For example, the sequence of travel paths (e.g., regions of interest on a flight path) may be connected by a continuous line 420 in virtual space between a virtually selected beginning point 422 and a virtually selected end point 424 of the virtual 3D travel path. The line of the 3D travel path may move continuously while changing throughout in each of X, Y, and Z coordinate axes within virtual space thereby simulating continuous three dimensional movement of the robot that is highly accurate. In addition, the 3D travel path 420 may wrap around the asset 410 one or more times while at the same time changing in each of X, Y, and Z coordinate axes along a continuous line generated by the system described herein.

Way points in real space correspond to regions of interests on the virtual space, and are points at which data and photos are to be captured by the robot. For example, in addition to video and still images, the data to be captured may include thermal images, ultraviolet images, sniffing for chemical concentrations, and the like, of various asset parts, asset sub-regions, and the like. The route planning can be done in multiple passes, for example, using RGB camera and IR camera separately. In addition, the inspection plan can be adjusted on the inspection site to focus on certain points of interest. For example, an IR camera pass may detect hot spots that are set for further inspection using the RGB camera.

According to various embodiments, the virtually created 3D travel path may be dynamically generated based on a plurality of user inputs with respect to a virtual replica of the physical asset which are received via a user interface. Here, the user interface may display the virtual model corresponding to the physical asset and receive regions of interest as well as other information from the user via commands through the user interface. In order to generate a real travel path, the virtual 3D travel path can be aligned or otherwise transformed from a virtual travel path into a real travel path. For example, the aligning of the dynamically created virtual 3D travel path may include converting X, Y, and Z coordinates of the virtual travel path in the virtual space into latitude, longitude, and height components of the real travel path in the real world.

The user interface described herein enables a 3D model of a flight path or travel path to be generated dynamically by a user via user inputs that are received through a user interface. In other words, the travel path can be created virtually. The inputs may be received with respect to a digital replica of the real asset. As a result, an initial flyby of the real asset is not required for determining a flight path of the unmanned robot. Rather, a user can virtually design a 3D virtual flight path virtual in 3D space that can perform a very accurate 3D inspection (e.g., within several centimeters of error) based on the virtually created 3D travel path without requiring an initial inspection of the asset thereby conserving energy consumption and time. Furthermore, the virtual 3D path can be created dynamically. For example, the user or an application or other program may select or otherwise input a dynamic virtual start point including a first vertical location and a first lateral location, and input a dynamically selected virtual end point including a second vertical location and a second lateral location which differ from the first vertical location and the first lateral location, respectively.

Referring again to FIG. 2, in 240, an autonomous or semi-autonomous inspection of the asset is performed by the unmanned robot (e.g., UAV, drone, crawler, roller, walker, etc.) based on the virtually created 3D travel path. In the example of a UAV, high-accuracy GPS systems and autopilot controllers allow the UAV to execute a complex and precise flight plan around assets based on the virtual 3D travel path included in the flight plan. The UAV may follow a pre-defined GPS guided route based on the site information, detailed asset 3D model and points of interests. The route guidance may be achieved by an embedded computing unit on the drone that controls the drone flight and/or highly accurate GPS antennas that can pinpoint the drone location within centimeters of accuracy. Also, other information instead of GPS may be used for localization of the robot such as known localization techniques in GPS denied areas. As another example, in 240, a semi-autonomous inspection may occur. For example, in a semi-autonomous inspection a user may control the flight or movement of the robot (or submersible) while the robot autonomously controls a sensor attached to the robot to change orientation and field of view while capturing data/images based on the flight inspection plan that includes the 3D travel path.

In addition, cameras and other sensors attached to the drone may also be controlled by the same embedded computing unit and synced with flight route to capture data exactly at point of interests (specified by experts during planning stage). In 250, a report may be generated by the robot or by the base station based on the data captured by the robot. The report may include identification of areas on the asset that need repair, replacement, maintenance, and the like, as well as health and status details about the asset based on the captured data. For example, one or more predictive analytics may be performed based on the captured data and added to the report.

In some examples, inspectors may supervise the overall operation of the unmanned robot performing the process inspection process 240 via a mobile application that monitors each part of the inspection process including sensor data and pictures, drone location, position with respect to the asset, and the like. In some cases, image quality analysis algorithms may automatically flag potential low quality pictures (e.g., unclear photos, point of interest too small or not within center of the frame, etc.), assisting the user to detect bad photos during the flight. Reduced quality copies of pictures taken by the drone may be sent to the mobile application where a user can then quickly verify the quality and accuracy of each picture. Images may also be geotagged and associated to their correspondent position in the flight plan and asset model. In addition, the robot can be instructed to re-run certain travel/flight paths and re-take a subset of the points of interest, during flight, if necessary, correcting potential errors on the spot. The resulting system allows for a single-user inspection (as opposed to multi-user inspection which has been traditionally required. The embodiments also provide the robot with control to start, stop, pause, and resume the movement/flight due to model-driven auto pilot.

The system provided herein also supports multiple-drone operation in multi configurations, optimizing inspection procedure. In a serial drone deployment, one drone may be deployed at a time, minimizing battery exchange down time. In a serial drone operation for multi-pass inspection, a first drone may perform a scan pass using an infra-red camera, following a model path, detecting hot spots and leaks and a second drone may perform a high-resolution image capture of hot spots detected by first drone. As another example, in parallel deployment, multiple drones may be deployed at a time, on a divide and conquer strategy, having each drone inspect a sub-area of the asset in parallel. In this example, route planning of multiple drones may be performed to avoid mid-air collision and distribute the points of interest to balance the load of each drone. As another example, the system may use a collaborative teams of robots. For example a drone may be used to deploy a crawler at a specific spot on the asset. In this example, drones and crawlers may communicate with each other to provide complementary sensory capabilities for inspection. As another example, a drone may be used for inspection, and a crawler may be used for maintenance and repair.

According to various aspects, the process 200 may reduce inspection time of a robot and cost due to improved data quality and accuracy (reduced inspection errors), reduced crew operations (e.g., one user instead of two or more), reduced flight time (optimal route planning, reduce time to take the same points of interest multiple time, less down time to change battery, detection of photo quality during the flight, etc.), and improved safety to the overall inspection process.

Figure 3:
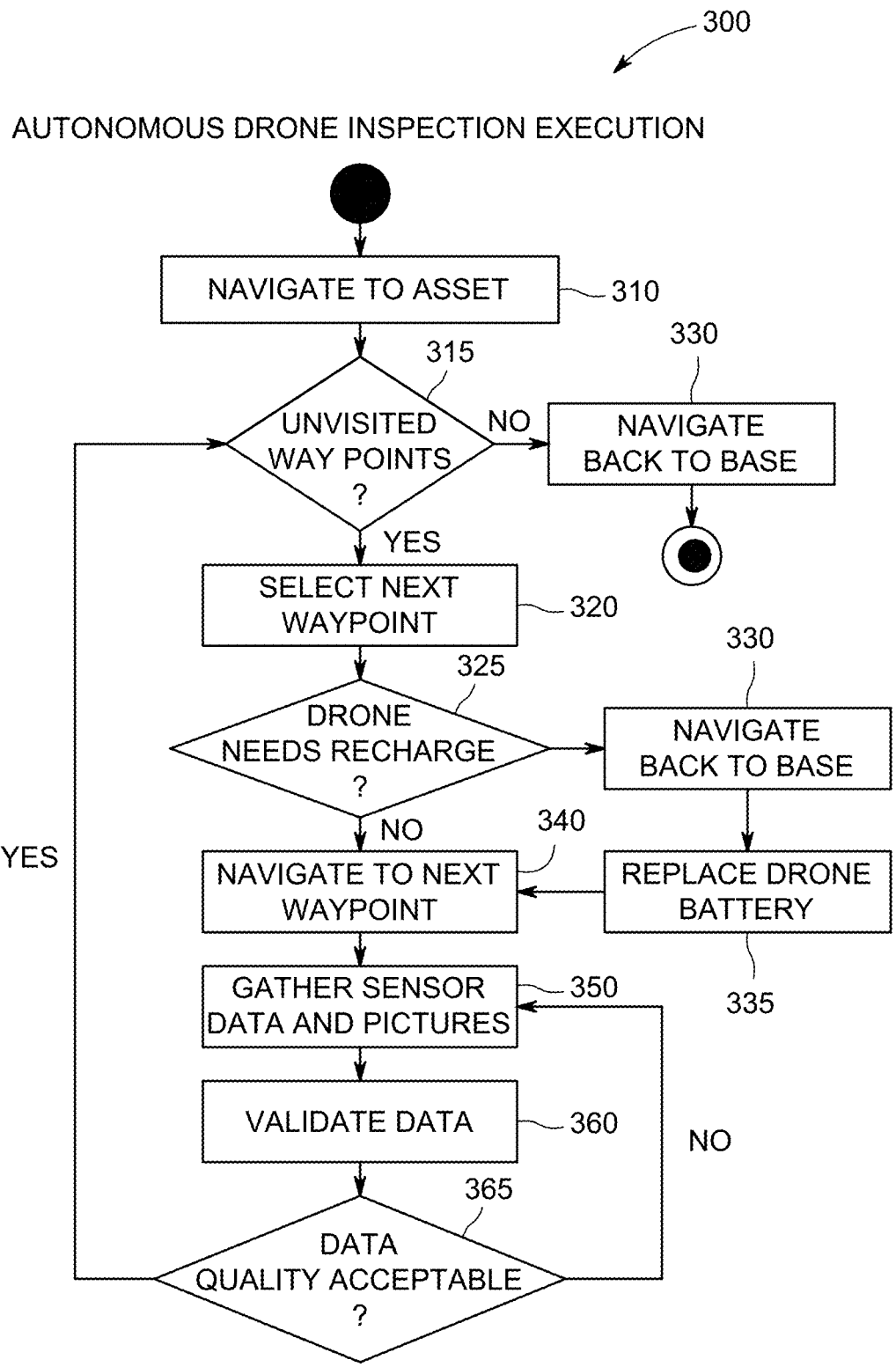
FIG. 3 is a diagram illustrating an autonomous robotic inspection method in accordance with an example embodiment.

FIG. 3 illustrates an autonomous robotic inspection method 300 in accordance with an example embodiment. For example, the method 300 may be performed by an unmanned robot such as a UAV, or another type of robot. Referring to FIG. 3, in 310, the method includes navigating from an initial point (e.g., loading dock, docking station, etc.) to a location of an asset. For example, the navigation may be based on GPS coordinates of the asset with respect to GPS coordinates of the robot. Here, the robot may store and execute a pre-defined flight inspection plan that includes a plurality of way points for the robot to travel past and capture data from. The inspection plan may include a virtually created 3D travel path. The robot may align the virtual 3D travel path with the real world based on GPS information of the drone and of the asset in real space. In 315, the method determines whether any way points remain to be visited, and if not, the method ends.

However, if there is at least one more way point determined to exist in 315, the method continues to 320, where a next way point is selected. In some embodiments, the robot may also perform a check to determine whether a battery thereof needs to be recharged in 325, navigate back to a base or charging station in 330, and replace or recharge the battery in 335. However, if the robot does not need a battery recharged in 325, in 340, the method navigates to the next way point selected in 320. For example, in 320, the robot may move lateral position and vertical position in a continuous movement about or around an asset based on a virtual 3D model of a travel path included in the predefined flight inspection plan stored on the robot or provided to the robot via a data link (e.g., in real time).

At 350, the robot gathers data at the selected way point and the data is validated in 360. For example, the robot may capture images and also measure additional data such as temperature, pressure, and the like, or capture additional data such as ultraviolet, thermal, etc. If the validated data is determined to be acceptable in 365, the method iteratively returns to 315 where a way point determination is made. If, however, the data is determined to be below a threshold level in 365, the method may return to 350 for additional data to be gathered by the robot. The method continues until it is determined at 315 that no more way points exist, at which time the robot may return to a docking station, shut down, and/or the like.

Figure 5:
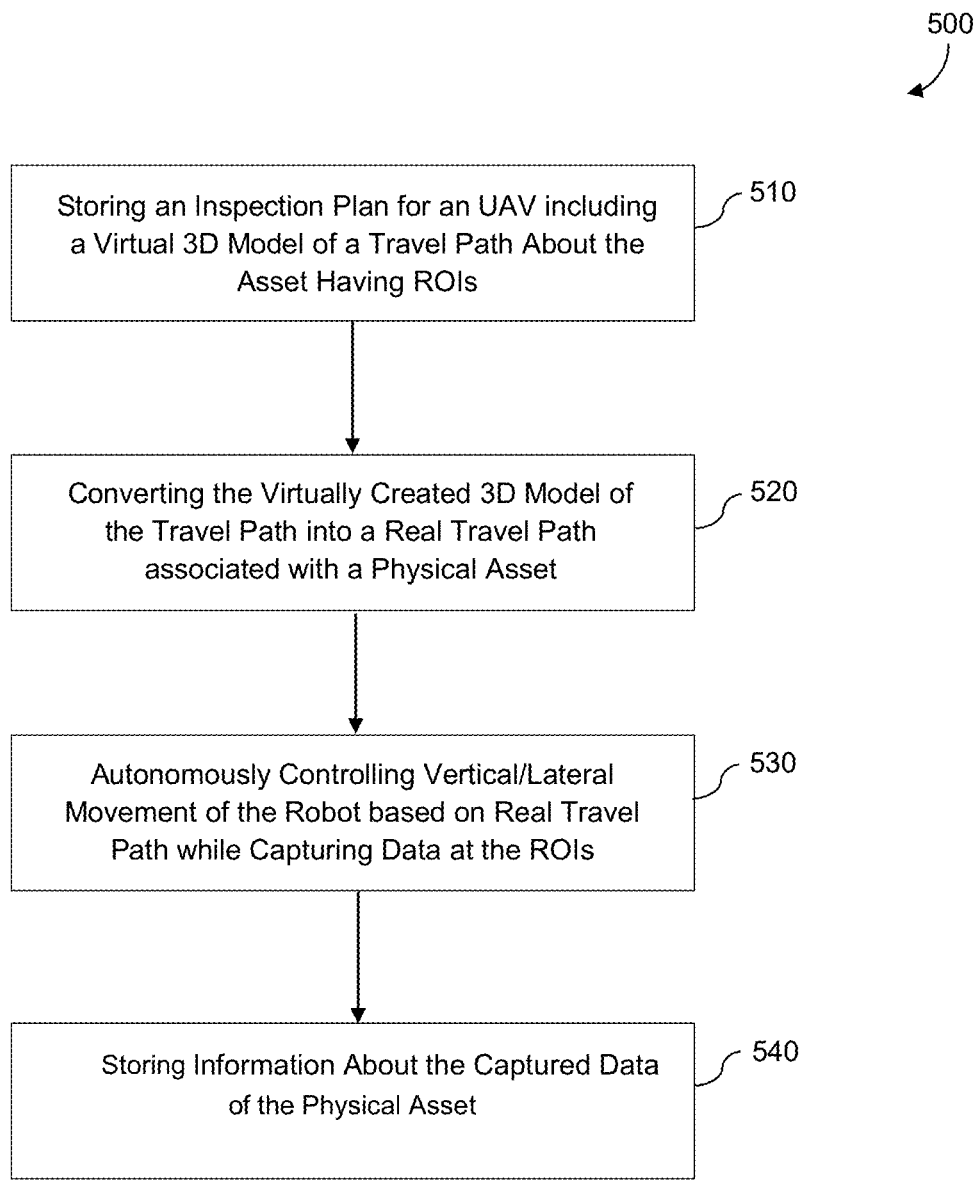
FIG. 5 is a diagram illustrating a method of an unmanned robot for monitoring an asset via an autonomous model-driven inspection, in accordance with an example embodiment.

FIG. 5 illustrates a method 500 of an unmanned robot for monitoring an asset via an autonomous model-driven inspection, in accordance with an example embodiment. For example, the method 500 may be performed by a processor of the unmanned robot and/or a processor of another device that controls the unmanned robot via one or more data communications. As one example, the unmanned robot may be a UAV, a crawling robot, a walking robot, a rolling robot, and the like. Referring to FIG. 5, in 510, the method includes storing an inspection plan of an asset to be performed by the unmanned robot. The inspection plan may be received from another device such as a base station, control station, another robot, and the like. The inspection plan may include a virtually created 3D model of a travel path about a virtual asset including regions of interest (ROI) along the travel path that are to be inspected. Here, the virtual asset may be a digital replica of a physical asset that is to be inspected by the unmanned robot. The virtually created 3D model of the travel path may be dynamically generated based on a plurality of user inputs with respect to the virtual replica of the physical asset displayed via a user interface.

For example, the virtual 3D model of the travel path may include a line or other marking that continuously moves throughout Cartesian coordinates (X, Y, and Z axes) in virtual space with respect to a virtual representation of the asset. The virtual 3D model may be generated dynamically by a user via a user interface that also displays the virtual asset. The user interface may receive user inputs with respect to the virtual asset and generate the 3D model of the travel path based on the inputs with respect to the virtual asset. The 3D model may provide lateral and vertical movement positions of the unmanned robot over time from a beginning point to an ending point. For example, the 3D model of the travel path may include a dynamically selected virtual start point including a first vertical location (i.e., height) and a first lateral location (i.e., latitude and longitude), and a dynamically selected virtual end point that includes a second vertical location and a second lateral location which differ from the first vertical location and the first lateral location, respectively. In addition, the 3D model may include a continuous path between the virtual start point and the virtual end point that moves around the asset. The 3D model of the travel path may also include a distance between the virtual travel path and the virtual asset (e.g., 5 meters, 10 meters, 15 meters, etc.) and an angle (also referred to as a perspective) at which a camera or other sensor should capture data (e.g., 30 degrees with respect to a surface of the asset, 125 degrees with respect to ground, etc.)

Next, the method includes executing the inspection plan without user control. For example, in 520 the executing may include converting the virtually created 3D model of the travel path into a real travel path with respect to a physical asset corresponding to the virtual asset, and in 530, the executing may include autonomously controlling vertical and lateral movement of the unmanned robot along the real travel path with respect to the physical asset, and capturing data at one or more regions of interest. For example, the converting of the virtually created 3D model of the travel path may include converting X, Y, and Z coordinates of the virtually created 3D model of the travel path in the virtual space into latitude, longitude, and height components of the real travel path in real space.

Although not shown in FIG. 5, the method 500 may include additional features. For example, the method may include autonomously controlling a distance between the unmanned robot and a surface of the physical asset at a region of interest based on distance information included in the inspection plan. Further, the executing may include controlling a field of view of an imaging capturing device of the unmanned robot with respect to a surface of the physical asset at a region of interest based on orientation information included in the inspection plan. As another example, the executing may include autonomously rotating the unmanned robot a predefined angle with respect to a fixed point on a surface of the physical asset at a region of interest based on rotation information included in the inspection plan. In some embodiments, the executing includes autonomously moving the unmanned robot from a real start point of the real travel path, around the asset one or more times, and to the real end point of the real travel path, based on the dynamically selected virtual start and end points of the virtually created 3D model of the travel path. In addition, in some embodiments the executing includes autonomously moving the unmanned robot from a docking station to the real starting point of the travel path based on the virtually created 3D model of the travel path and global positioning system (GPS) information.

In 540, information concerning the captured data about the asset is stored, for example, in a removable storage such as a flash drive or SD card, or output to another device. For example, the sensors may include imaging sensors such as a camera, video recorder, or the like. As another example, the sensors may sense for other data such as temperature, pressure, humidity, or the like. The captured data or information associated therewith may be stored and/or output to a base station, cloud server, or other computing device that is wirelessly connected to the robot via one or more data links. The stored data may include images, as well as the results of analytical applications or other operations performed based on the captured data.

Figure 6:
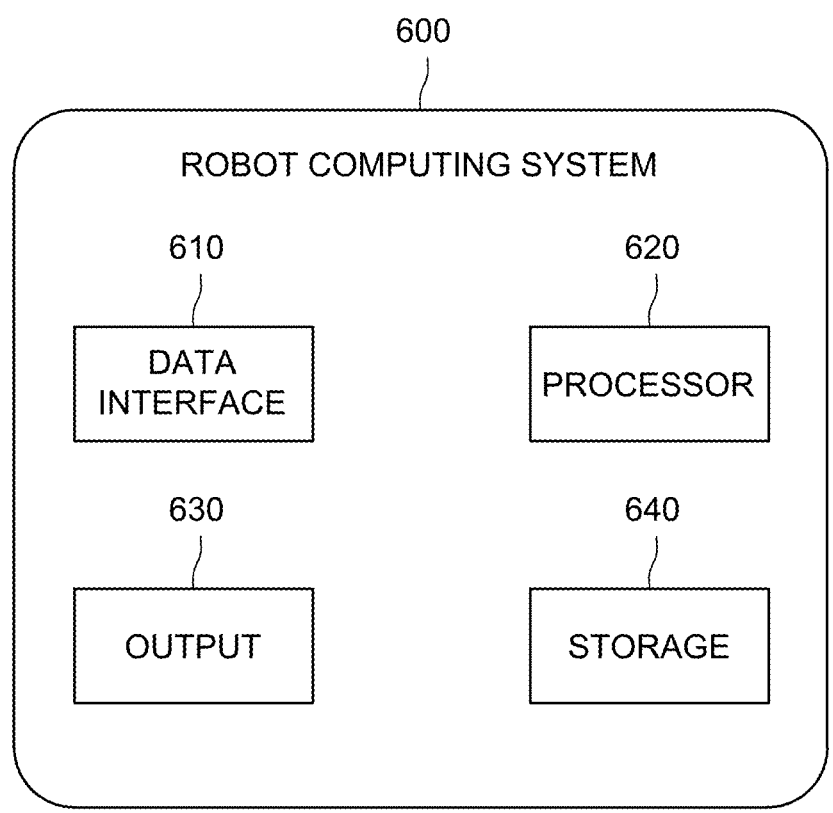
FIG. 6 is a diagram illustrating a robotic inspection computing system in accordance with an example embodiment.

FIG. 6 is a diagram illustrating a robotic inspection computing system 600 in accordance with an example embodiment. For example, the robotic system 600 may be embedded with a robot such as a UAV, and the like, or it may be a separate device that is in communication with the robot and controls the robot via a wired or wireless connection. Referring to FIG. 6, the robot system 600 includes a data interface 610, a processor 620, an output 630, and a storage 640. Although not shown in FIG. 6, the robotic system 600 may include other components such as motors, rotors, blades, a body, etc. The data interface 610 may be a data communication interface such as a network interface that transmits and receives data over a network such as the Internet, a private network, a public network, and the like, via a satellite network, a cellular network, a local network, and/or the like. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the system 600 or another device externally connected to the system 600, and the like. The storage device 640 is not limited to any particular storage device and may include any known memory device such as RAM, ROM, hard disk, and the like.

According to various embodiments, the data interface 610 may receive an inspection plan from an external device such as a base station, cloud computing system, and/or the like. As another example, the inspection plan may be generated locally via an input unit included with the robot system 600. The storage 640 may store the inspection plan. The storage 640 may also store a model of the asset to be inspected as well as a model of the world. As described herein, the inspection plan may include a virtually created 3D model of a travel path about the asset including virtual regions of interest (ROI) to be inspected by the unmanned robot. Here, the virtually created 3D model may include a flight inspection path for an UAV that is generated dynamically based on user inputs via a user interface with respect to a virtual replica of the asset shown via the user interface. The flight inspection path may include 3D coordinates (e.g., Cartesian coordinates) in virtual space about and/or around the virtual asset as well as virtual regions of interest at which data should be captured. As another example, the inspection plan may be a crawling inspection plan, walking inspection plan, rolling inspection plan, and the like.

The processor 620 may execute the inspection plan without user control. For example, the executing may include converting the virtually created 3D model of the travel path into a real travel path with respect to a physical asset corresponding to the virtual asset, and autonomously controlling vertical and lateral movement of the unmanned robot along the real travel path. In addition, the processor 620 may control one or more sensors of the robot to capture data of the asset while the unmanned robot is on the travel path. The output 630 may output information concerning the data of the asset captured by the unmanned robot for display on a display device. Also, the storage 640 may store the data of the asset captured by the unmanned robot. In this example, the storage 640 may store captured images and other readings as well as indications about whether each point of inspection was a success or a failure.

In some embodiments, the processor 620 may autonomously control a distance between the unmanned robot and a surface of the asset at a ROI based on distance information included in the inspection plan. In some embodiments, the processor 620 may autonomously control a field of view of an imaging capturing device with respect to a surface of the asset at a ROI based on orientation information included in the inspection plan. In some embodiments, the processor 620 may autonomously rotate the unmanned robot a predefined angle with respect to a fixed point on a surface of the asset at a ROI based on rotation information included in the inspection plan. According to various aspects, the processor 620 may autonomously move the unmanned robot from the start point of the travel path, around the asset one or more times, and to the end point of the travel path, based on the 3D model of the travel path. In some embodiments, the processor 620 may autonomously move the unmanned robot from a docking station to the starting point of the travel path based on the 3D model of the travel path and global positioning (GPS) information.

Although the examples herein are provided, for the most part, with respect to assets on land it should be appreciated that the embodiments may be incorporated with submersible drones for inspecting underwater assets. In this situation, the virtual created 3D travel path would be created in the same way but instead of a travel path being through the air it would be through water or some other liquid based environment such as oil, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A robotic inspection system, comprising:
a storage configured to store a three-dimensional (3D) model of a travel path with respect to a virtual asset that is created in virtual space; and
a processor configured to:
convert the 3D model of the virtual travel path about a surface of the virtual asset into a physical travel path about a surface of a physical asset corresponding to the virtual asset by aligning the 3D model of the virtual travel path to the physical travel path in a physical space based on geo-spatial information of the physical asset;
autonomously move an unmanned robot in three dimensions including lateral and vertical movement from a physical start point to a physical end point with respect to the physical asset based on distances and angles between a corresponding dynamically selected virtual start point and a corresponding dynamically selected virtual end point within the 3D model of the virtual travel path aligned with the physical travel path and without using physical location components sensed using a sensor; and
capture data at one or more regions of interest,
wherein the storage is further configured to store information concerning the data about the physical asset.

2. The robotic inspection system of claim 1, wherein the 3D model of the virtual travel path is dynamically generated based on a plurality of user inputs with respect to a virtual replica of the physical asset displayed via a user interface.

3. The robotic inspection system of claim 1, wherein the processor is configured to convert the 3D model of the virtual travel path by aligning X, Y, and Z coordinates of the 3D model of the virtual travel path in the virtual space into latitude, longitude, and height components of the physical travel path in the physical space.

4. The robotic inspection system of claim 1, wherein the processor is further configured to autonomously control a distance between the unmanned robot and the surface of the physical asset at a region of interest from among the one or more regions of interest based on distance information included in the 3D model of the virtual travel path.

5. The robotic inspection system of claim 1, wherein the processor is further configured to autonomously control a field of view of an imaging capturing device of the unmanned robot with respect to the surface of the physical asset at a region of interest from among the one or more regions of interest based on orientation information included in an inspection plan.

6. The robotic inspection system of claim 1, wherein the processor is further configured to autonomously rotate the unmanned robot a predefined angle with respect to a fixed point on the surface of the physical asset at a region of interest from among the one or more regions of interest based on rotation information included in an inspection plan.

7. The robotic inspection system of claim 1, wherein the 3D model of the virtual travel path comprises the corresponding dynamically selected virtual start point comprising a first vertical location and a first lateral location, and the corresponding dynamically selected virtual end point comprising a second vertical location and a second lateral location which differ from the first vertical location and the first lateral location, respectively.

8. The robotic inspection system of claim 7, wherein the processor is further configured to autonomously move the unmanned robot from the physical start point of the physical travel path, around the physical asset one or more times, and to the physical end point of the physical travel path, based on the corresponding dynamically selected virtual start and end points of the 3D model of the virtual travel path and without using sensor information of a physical location of the unmanned robot while moving.

9. The robotic inspection system of claim 8, wherein the processor is further configured to autonomously move the unmanned robot from a docking station to the physical start point of the physical travel path based on the 3D model of the virtual travel path and the geo-spatial information of the physical asset.

10. The robotic inspection system of claim 1, wherein the processor is further configured to autonomously move the unmanned robot in three dimensions based on a virtual distance measured between a virtual line of the virtual travel path and a 3D model of the virtual asset within the virtual space.

11. A method of an unmanned robot for monitoring an asset via an autonomous model-driven inspection, the method comprising:
storing a three-dimensional (3D) model of a virtual travel path with respect to a surface of a virtual asset in a virtual space;
converting the 3D model of the virtual travel path about the surface of the virtual asset into a physical travel path about a surface of a physical asset corresponding to the virtual asset by aligning the 3D model of the virtual travel path to the physical travel path in physical space based on geo-spatial information of the physical asset;
autonomously moving the unmanned robot in three dimensions including lateral and vertical movement from a physical start point to a physical end point, with respect to the physical asset based on distances and angles between a corresponding dynamically selected virtual start point and a corresponding dynamically selected virtual end point within the 3D model of the virtual travel path aligned with the physical travel path and without using physical location components sensed using a sensor, and capturing data at one or more regions of interest; and
storing information concerning the data about the physical asset.

12. The method of claim 11, wherein the 3D model of the virtual travel path is dynamically generated based on a plurality of user inputs with respect to a virtual replica of the physical asset displayed via a user interface.

13. The method of claim 11, wherein converting the 3D model of the virtual travel path comprises aligning X, Y, and Z coordinates of the 3D model of the virtual travel path in the virtual space into latitude, longitude, and height components of the physical travel path in the physical space.

14. The method of claim 11, wherein the method further comprises autonomously controlling a distance between the unmanned robot and the surface of the physical asset at a region of interest from among the one or more regions of interest based on distance information included in the 3D model of the virtual travel path.

15. The method of claim 11, wherein the method further comprises autonomously controlling a field of view of an imaging capturing device of the unmanned robot with respect to the surface of the physical asset at a region of interest from among the one or more regions of interest based on orientation information included in an inspection plan.

16. The method of claim 11, wherein the method further comprises autonomously rotating the unmanned robot a predefined angle with respect to a fixed point on the surface of the physical asset at a region of interest from among the one or more regions of interest based on rotation information included in an inspection plan.

17. The method of claim 11, wherein the 3D model of the virtual travel path comprises the corresponding dynamically selected virtual start point comprising a first vertical location and a first lateral location, and the corresponding dynamically selected virtual end point comprising a second vertical location and a second lateral location which differ from the first vertical location and the first lateral location, respectively.

18. The method of claim 17, wherein the method further comprises autonomously moving the unmanned robot from the physical start point of the physical travel path, around the physical asset one or more times, and to the physical end point of the physical travel path, based on the corresponding dynamically selected virtual start and end points of the 3D model of the virtual travel path and without using sensor information of a physical location of the unmanned robot while moving.

19. The method of claim 18, wherein the method further comprises autonomously moving the unmanned robot from a docking station to the physical start point of the physical travel path based on the 3D model of the virtual travel path and the geo-spatial information of the physical asset.

20. A non-transitory computer readable medium having stored therein instructions that when executed cause a computer to perform a method of an unmanned robot for monitoring an asset via an autonomous model-driven inspection, the method comprising:
storing a three-dimensional (3D) model of a virtual travel path with respect to a surface of a virtual asset in a virtual space;
converting the 3D model of the virtual travel path about the surface of the virtual asset into a physical travel path about a surface of a physical asset corresponding to the virtual asset by aligning the 3D model of the virtual travel path to the physical travel path in a physical space based on geo-spatial information of the physical asset;
autonomously moving the unmanned robot in three dimensions including lateral and vertical movement from a physical start point to a physical end point with respect to the physical asset based on distances and angles between a corresponding virtual start point and a corresponding virtual end point within the 3D model of the virtual travel path aligned with the physical travel path and without using physical location components sensed using a sensor, and capturing data at one or more regions of interest; and storing information concerning the data about the physical asset.

* * * * *